United States Patent
Zimmerschied et al.

(10) Patent No.: US 9,091,226 B2
(45) Date of Patent: Jul. 28, 2015

(54) METHOD AND DEVICE FOR ADAPTING A LAMBDA CONTROL

(71) Applicant: Robert Bosch GmbH, Stuttgart (DE)

(72) Inventors: Ralf Zimmerschied, Wiesbaden (DE); Richard Holberg, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 384 days.

(21) Appl. No.: 13/659,637

(22) Filed: Oct. 24, 2012

(65) Prior Publication Data

US 2013/0103285 A1    Apr. 25, 2013

(30) Foreign Application Priority Data

Oct. 24, 2011    (DE) .......................... 10 2011 085 115

(51) Int. Cl.
| | |
|---|---|
| *F02D 41/00* | (2006.01) |
| *F02D 41/14* | (2006.01) |
| *F02D 41/22* | (2006.01) |
| *F02D 41/24* | (2006.01) |

(52) U.S. Cl.
CPC ........ *F02D 41/1402* (2013.01); *F02D 41/1454* (2013.01); *F02D 41/1481* (2013.01); *F02D 41/1495* (2013.01); *F02D 41/222* (2013.01); *F02D 41/2454* (2013.01); *F02D 2041/1433* (2013.01); *Y02T 10/40* (2013.01)

(58) Field of Classification Search
CPC ............ F02D 41/1454; F02D 41/2454; F02D 41/1402; F02D 2041/1433
USPC ............ 123/672, 690, 693; 60/276; 701/103, 701/109; 73/114.69, 114.71, 114.72
See application file for complete search history.

(56) References Cited

U.S. PATENT DOCUMENTS

| | | | | |
|---|---|---|---|---|
| 4,899,280 | A * | 2/1990 | Onari et al. ................... | 701/103 |
| 6,266,605 | B1 * | 7/2001 | Yasui et al. ................... | 701/109 |
| 6,292,739 | B1 * | 9/2001 | Yasui et al. ................... | 701/109 |
| 6,684,150 | B2 * | 1/2004 | Yasui et al. ................... | 701/106 |
| 2003/0070667 | A1 | 4/2003 | Yasui et al. | |
| 2004/0030485 | A1 * | 2/2004 | Yasui ............................ | 701/109 |
| 2008/0120962 | A1 * | 5/2008 | Okugawa et al. ............. | 60/274 |
| 2009/0182490 | A1 | 7/2009 | Saunders | |
| 2010/0083743 | A1 | 4/2010 | Wehmeier et al. | |

FOREIGN PATENT DOCUMENTS

| | | |
|---|---|---|
| EP | 1048834 | 11/2000 |
| EP | 1143132 | 10/2001 |
| JP | 2010129542 | 6/2010 |

* cited by examiner

*Primary Examiner* — Hai Huynh
(74) *Attorney, Agent, or Firm* — Michael Best & Friedrich LLP

(57) ABSTRACT

A method for adapting a lambda control of an internal combustion engine having an exhaust gas probe disposed in an exhaust gas duct of the internal combustion engine as part of an exhaust gas monitoring system, wherein the adaptation is carried out on the basis of a comparison between a modeled and a measured signal after a predetermined change in the fuel-air ratio of an air-fuel mixture supplied to said internal combustion engine has taken place and wherein the measured signal is an actual value of an output signal of the exhaust gas probe and the modeled signal is a modal value, which is derived from the air-fuel mixture supplied to said internal combustion engine through the use of an exhaust gas model.

17 Claims, 1 Drawing Sheet

METHOD AND DEVICE FOR ADAPTING A LAMBDA CONTROL

BACKGROUND OF THE INVENTION

The invention relates to a method for adapting a lambda control of an internal combustion engine having an exhaust gas probe disposed in an exhaust gas duct as part of an exhaust gas monitoring system, wherein the adaptation is carried out on the basis of a comparison of a modeled and a measured signal according to a predetermined change in an fuel-air ratio of an air-fuel mixture supplied to the internal combustion engine and wherein the measured signal is an actual value of an output signal of the exhaust gas probe and the modeled signal is a model value, which is derived from the air-fuel mixture supplied to the internal combustion engine using an exhaust gas model.

The invention further relates to a device for carrying out the method.

In order to reduce harmful exhaust emissions in passenger cars with Otto engines, 3-way catalytic converters are used as emission control systems, which only then sufficiently convert exhaust gases if the air-fuel ratio λ is very precisely adjusted. For this purpose, the air-fuel ratio λ is measured by an exhaust gas probe disposed upstream of the emission control system. The storage capacity of such an emission control system for oxygen is utilized for the purpose of receiving oxygen during lean phases and in turn dispensing oxygen during rich phases. This ensures that oxidizable constituents of harmful gas contained in the exhaust gas can be converted. An exhaust gas probe disposed downstream of the emission control system thereby serves to monitor the oxygen storage capacity of said emission control system. The oxygen storage capacity has to be monitored within the scope of the on-board diagnostics because said capacity represents a measurement for the conversion capacity of said emission control system. In order to determine said oxygen storage capacity, either the emission control system is initially saturated with oxygen in a lean phase and is subsequently emptied in a rich phase having an exhaust gas of a known lambda ratio with regard to the amount of exhaust gas passing through said emission control system or said system is initially emptied of oxygen in a rich phase and in a lean phase is subsequently filled with an exhaust gas of a known lambda ratio with regard to the amount of exhaust gas passing through said system. The lean phase is ended if the exhaust gas probe downstream of said emission control system detects the oxygen, which can no longer be stored by said emission control system. A rich phase is likewise ended if said exhaust gas probe detects the passage of rich exhaust gas. The oxygen storage capacity of the emission control system corresponds to the amount of reducing agent supplied during the rich phase to empty said system of oxygen or respectively to the amount of oxygen supplied during the lean phase to fill said system with oxygen. The exact amounts are calculated from the signal of the exhaust gas probe disposed upstream of said emission control system and from the exhaust gas mass flow determined from other sensor signals.

If the dynamic behavior of the exhaust gas probe disposed upstream of the emission control system decreases, e.g. as a result of contamination or ageing, the air-fuel ratio can no longer be adjusted with the required precision so that the conversion capacity of said emission control system decreases. In addition, deviations during the diagnosis of said emission control system can result which can lead to an emission control system which is in good working order to be mistakenly determined to be inoperative. Lawmakers require a diagnosis of the exhaust gas probe properties during vehicle operation in order to ensure that the required air-fuel ratio can still be adjusted with sufficient accuracy, to ensure that the admissible limit values are not exceeded and to ensure that said emission control system is being correctly monitored. Among other things, a degradation of the probe dynamics must be detected, which can become apparent as a result of an enlarged time constant and/or dead time.

The German patent publication DE 10 2008 042 549 A1 discloses a method and device for diagnosing the slew rate and the dead time of an exhaust gas probe, which is disposed in the exhaust gas duct of an internal combustion engine, wherein the diagnosis is carried out on the basis of a comparison of a modeled and a measured signal after a predetermined change in a fuel-air ratio of an air-fuel mixture delivered to the internal combustion engine has taken place and wherein the signal is an output signal of the exhaust gas probe or a modeled or measured signal derived from the output signal. Provision is thereby made for a first extreme value to be determined in the curve of the modeled signal and for a first point in time and a first starting value to be determined if the modeled signal deviates from the first extreme value by a predetermined amount. Provision is also thereby made for a second extreme value in the curve of the measured signal to be determined. In addition, provision is made for a second point in time and a second starting value to be determined if the measured signal deviates from the second extreme value by a predetermined value, for a first integral for a predetermined period of time, beginning at the first point in time, over the difference between the first starting value and the modeled signal to be formed and for a second integral for a second period of time, beginning at the second point in time, over the difference between the second starting value and the measured signal to be formed, for the second period of time to equal the predetermined period of time and for the end of the second period of time to be determined on the basis of the point in time of the change in the fuel-air ratio or on the basis of the first point in time. Provision is finally made for a quantitative comparison value to be formed from a quantitative comparison between the first integral and the second integral, the slew rate and/or the dead time of the exhaust gas probe being suggested from said quantitative comparison value.

This method uses steplike adjustments of the air-fuel ratio, by means of which the dynamic behavior of the exhaust gas probe is evaluated. In so doing, an anisotropy, i.e. from rich to lean or from lean to rich, is additionally distinguished. For this purpose, the area below the lambda signal of the exhaust gas probe is integrated for a certain period of time after the step change and set in relation to an analogously calculated area on a lambda signal modeled in the control device. If the calculated ratio is smaller than an applicable threshold, the exhaust gas probe no longer meets the required level of dynamic behavior.

In order to model the air-fuel ratio in the control device, a first-order filter having a time constant T, a gain K=1 as well as a dead time model having the dead time $T_t$ is used. The first-order filter can thus be described as follows:

$$G_{(s)} = K\exp(-T_t s)/(Ts+1) \tag{1}$$

In some engines, the method proves however to be partially insufficiently robust and leads to dispersive diagnostic results. A reason for this is among other things that the real gain of the lambda controlled system frequently deviates from the value K=1, which is theoretically expected and used in the control device. This has a strong influence on the area ratio and is therefore misinterpreted as a change in the probe dynamics although said deviation relates to a deviating loop gain. This behavior is known for all engines to a greater or lesser extent, wherein the gain from operating point to operating point varies without a systematic basis and can be compensated only with difficulty.

A further method—referred to in this case as the gradient method—uses likewise steplike adjustments of the air-fuel ratio and determines the maximum gradient according to amount of the measured air-fuel ratio within a certain period of time after the step change has taken place. The period of time for evaluation results from an applicable deviation, by which the measured air-fuel ratio may change after the step change. Said period of time is interpreted as the dead time, corrected by the difference between the point in time at the end of the evaluation and the point in time whereat a straight line having the previously determined maximum gradient divided by the value of the measured air-fuel ratio at the end of the evaluation intersects with the value of the minimum/maximum measured air-fuel ratio during the evaluation. A time constant error is detected by a maximum gradient which is too small in amount.

The same calculation can also be carried out analogously with inverted lambda signals.

SUMMARY OF THE INVENTION

The aim of the invention is to initially improve the lambda control and to optimize the previously described method with regard to improved diagnostics.

It is furthermore the aim of the invention to provide a corresponding device for carrying out the method.

The aim of the invention is met by virtue of the fact that an incremental adaptation of the lambda controller parameters of a lambda control is carried out, wherein a difference between a maximum gradient according to amount of the measured air-fuel ratio (AFR) and a maximum gradient according to amount expected from the model for the air-fuel ratio (AFR) is used as the quality criterion. The lambda control can be improved using the method. It is thereby advantageous that an oscillation in the air-fuel ratio can be reduced or even eliminated. This has a positive effect on the emissions and driveability of the vehicle.

As provision is made in a variant of the method, the lambda controller can be adapted on the basis of said aforementioned difference by said lambda controller being incrementally adjusted in the direction of a larger or smaller loop time constant, wherein the size of the controller adjustment can be selected as a function of said difference. Hence, a time constant $T_S$ for the exhaust gas probe can, for example, be maintained and adapted when a preferably abrupt step change in the AFR of the lambda control occurs. The adaptation is based on a comparison of the maximum gradient of the measured AFR and the AFR expected according to the model, wherein the expected AFR is calculated with the aid of a filter having the time constant $T_S$. If the gradients are the same or have only a small difference, $T_S$ then remains unchanged. It is then to be assumed that $T_S$ corresponds to the actual probe time constant. If the gradient of the measured AFR is smaller than that of the expected AFR, $T_S$ is increased for the next iteration step. If the gradient of the measured AFR is on the other hand larger, $T_S$ is reduced for the next iteration step. The term "incremental" indicates that $T_S$ is changed in each case only by a relatively small amount. The method proceeds gradually rather than trying to determine the actual probe time constant in one step. This is then advantageous if an exact calculation of the probe time constant is not possible from one event, e.g. due to disturbances, inaccurately modeled input variables, as, for example, air mass flow, or if the closed-loop control circuit has relatively high controller dynamics so that calculation formulas of an open-loop control circuit cannot be used.

In order to increase the robustness of the dynamic diagnosis of the exhaust gas probe, provision can be made for the incremental adaptation to be stopped in the case of a difference which is smaller than an applicable threshold value and for the last adjusted loop time constant for the course of the air-fuel ratio (AFR), which was determined on a model basis, to be used for the dynamic diagnosis of the exhaust gas probe.

In an advantageous variant of the method, the invention can furthermore provide that, depending on the controller structure, an increase or decrease in controller gain and/or an adaptation of time constants in controller internal system models are carried out in order to adapt the controller parameters to the changed loop time constant.

The aim relating to the method can also be met if a time constant $T_S$ for the exhaust gas probe is calculated from the maximum gradient according to amount of the measured air-fuel ratio (AFR), wherein the adaptation is performed on the basis of a measured signal after a predetermined change in a fuel-air ratio of an air-fuel mixture supplied to the internal combustion engine has taken place and wherein the measured signal is an actual value of an output signal of the exhaust gas probe. The advantage of an explicitly calculated time constant is that said constant cannot only be used better and more understandably as the diagnostic result of the exhaust gas probe but can also additionally serve to adapt the parameters of the lambda controller, which in the case of some controllers ensue directly from the controlled system parameters, such as the time constant. In addition, the explicitly calculated time constant can also be advantageously used by other functions such as the catalytic converter diagnostics.

If the derivation of the time constant $T_S$ is based on a second-order system model having two time constants, wherein a step response is evaluated in an open-loop control circuit, the adaptation of the controller can be improved.

In order to be able to determine the second time constant from a nominal time constant as well as from the maximum gradient according to amount, provision is made in a preferred variant of the method for the derivation of the time constant $T_S$ to be carried out by means of an offline evaluation of an analytical equation, which describes a maximum gradient of a step response of a second-order filter having two time constants, wherein the correlations are deposited in a diagnostic unit in the form of an inverse characteristic curve and the time constant $T_S$ is determined by accessing said characteristic curve. Accessing the characteristic curve is thereby especially advantageous because a solution of the analytical equation, e.g. by a non-linear optimization, in the diagnostic unit can more likely only be implemented with great difficulty.

With regard to an improved lambda control, provision can be made for the adaptation of the lambda controller parameters to be performed on the basis of the determined loop time constant or the determined time constant $T_S$.

A preferred variant to the method provides further for the determined loop time constant or the determined time constant $T_S$ to be compared to an applicable threshold value and for a dynamic behavior for the exhaust gas probe to be derived therefrom within the scope of the dynamics diagnostics. If this threshold value is exceeded, a lethargic exhaust gas probe, e.g. as a result of ageing, can be assumed, said probe no longer being suitable in terms of an optimal lambda control. This condition can be indicated to the vehicle operator via a corresponding error display and/or by means of a corresponding error entry being placed into the engine management system of the internal combustion engine.

If the controller speed is reduced during the diagnosis, which, for example, can occur as a result of a reduction of the gain, the influence of the controller is reduced and the behavior of the closed-loop control circuit is approximated to that of the open-loop control circuit, whereby the accuracy of the time constant calculation can be increased.

The method comprising the previously described variants thereof can be used in a preferable manner for a diagnosis of a broadband lambda probe or for the diagnosis of a nitrogen oxide sensor. In the case of an exhaust gas probe embodied as a broadband lambda probe or as a continuous lambda probe, a lambda actual value is compared as part of the diagnosis to a modeled lambda model value in accordance with the previously described variants of the method. In the case of a nitrogen oxide sensor, the output signal of the nitrogen oxide sensor is evaluated as the actual value, wherein the model value is determined from a modeled $NO_x$ value. This diagnosis can therefore particularly be used advantageously with Otto engines or with lean-burn engines, the emission control system of which has a catalytic converter and/or devices for reducing nitrogen oxides. A further application of the method comprising the previously described variants thereof can generally be provided in processes having at least one sensor, in which the process can be approximated by a first-order filter having a time constant as well as if applicable a dead time and the behavior of a sensor with a slowed response time can be described through the use of an additional first-order filter. In principle, the advantages previously described also result in this instance with regard to an assessment of the response behavior of the sensor. In addition, such a process can be improved with regard to the control performance thereof.

The aim relating to the device is met by virtue of the fact that a diagnostic unit is provided to carry out the method according to the invention, which comprises calculating units for calculating the difference as well as storage units for characteristic curves and comparators for performing the adaptation in accordance with the variants of the method previously described, and by virtue of the fact that a time constant for the exhaust gas probe can be derived, which can be used for a dynamic diagnosis of said exhaust gas probe. The functionality of the diagnostic unit can thereby at least partially be embodied in a software based manner, wherein said functionality can be provided as a separate unit or as part of an overriding engine management system.

BRIEF DESCRIPTION OF THE DRAWINGS

The invention is explained below in detail using an exemplary embodiment depicted in the figures. In the drawings.

DETAILED DESCRIPTION

Figure 1:
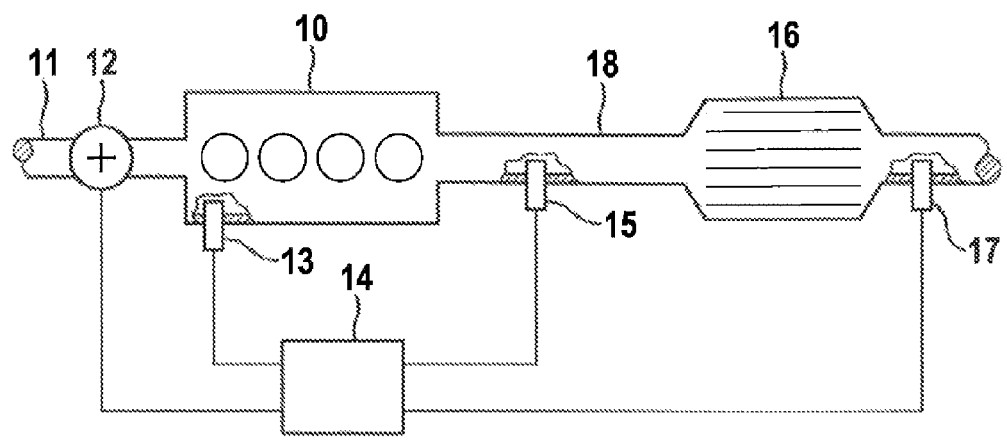
FIG. 1 shows in schematic depiction the technical environment, in which the method according to the invention can be used

In an example of an Otto engine, FIG. 1 shows schematically the technical environment in which the inventive method for diagnosing an exhaust gas probe 15 can be used. Air is supplied to an internal combustion engine 10 via an air duct 11 and the mass of said air is determined with an air mass flow meter 12. The air mass flow meter 12 can be embodied as a hot film air mass flow meter. The exhaust gas of the internal combustion engine 10 is discharged via an exhaust gas duct 18, wherein an emission control system 16 is provided in the direction of flow of the exhaust gas downstream of said internal combustion engine 10. The emission control system 16 typically comprises at least one catalyst.

In order to control the internal combustion engine 10, an engine management system 14 is provided, which on the one hand delivers fuel to said internal combustion engine 10 via a fuel metering unit 13 and to which on the other hand the signals of the air mass flow meter 12 and the exhaust gas probe 15 disposed in the exhaust gas duct 18 as well as the exhaust gas probe 17 disposed in the exhaust gas discharge pipe 18 are supplied. In the example shown, the exhaust gas probe 15 determines a lambda actual value of a fuel-air mixture supplied to said internal combustion engine 10. Said exhaust gas probe 15 can be embodied as a broadband lambda probe or as a continuous lambda probe. The exhaust gas probe 17 determines the exhaust gas composition downstream of the emission control system 16. Said exhaust gas probe 17 can be embodied as a discrete-level sensor or binary sensor.

With regard to an improved adaptation of a lambda control of the internal combustion engine 10, provision is made according to a preferred variant of the method for the adaptation to be performed on the basis of a comparison of a modeled to a measured signal after a predetermined change in an air-fuel ratio (AFR) of the air-fuel mixture supplied to the internal combustion engine 10, wherein the measured signal is an actual value of an output signal of the exhaust gas probe 15 and the modeled signal is a model value, which is derived from the air-fuel mixture supplied to said internal combustion engine 10 through the use of an exhaust gas model. According to the invention, an incremental adaptation of the lambda controller parameters of the lambda control is hereby provided, wherein a difference between a maximum gradient according to amount of the measured AFR and a maximum gradient according to amount for the AFR expected from the model is used as the quality criterion. On the basis of said difference, the lambda controller can be adapted, for example, by said controller being incrementally adjusted in the direction of a larger or smaller loop time constant, the size of the controller adjustment being selected as a function of said difference.

For the purpose of diagnosing the dynamics of the exhaust gas probe 15, an incremental adaptation of the lambda controller parameters is provided by means of a comparison of the maximum gradient according to amount of the measured air-fuel ratio to an expected maximum gradient according to amount.

In addition, the gradient method is expanded by a time constant being explicitly calculated from the maximum gradient according to amount of the measured air-fuel ratio, which facilitates the diagnosis as well as the controller adaptation.

For the purpose of modeling the air-fuel ratio from the injection of fuel up to the exhaust gas probe, a first-order filter is used if an error occurs, as said filter was described above according to the equation (1). If an error occurs, a dynamically slow probe acts however like an additional first-order filter; and therefore the total system can be modeled by a dead time $T_t$ and a second-order filter having two time constants T and $T_S$ for the probe:

$$G_{(S)} = K \exp(-T_t s)/((Ts+1)(T_S s+1)) \quad (2)$$

For the purpose of diagnosing the dynamics of the exhaust gas probe 15 embodied as a continuous lambda probe, the air-fuel ratio is adjusted in the combustion chamber in a steplike manner; and within a certain period of time after the step change, the maximum gradient according to amount of the measured air-fuel ratio is determined.

If the maximum gradient according to amount of the measured air-fuel ratio is compared to an expected maximum gradient according to amount by generating the difference, a measurement is provided as to what extent the probe with a slowed response time leads to a deviation from the nominal time constant used to adjust the controller. On the basis of said difference, the controller is adapted by the same being incrementally adjusted in the direction of a larger or smaller loop time constant, wherein the size of the controller adjustment is selected as a function of said difference. According to the structure of the controller, different measures can thereby be taken. Said measure can include, e.g., increasing or decreasing the controller gain or an adaptation of time constants in controller internal loop models. The expected maximum gradient according to amount can be calculated from the nominal time constant T or determined by measurements on an error-free system.

If the parameters of the controller can be calculated from the parameters of the loop, the adaptation of the controller can be improved, i.e. the adaptation will be faster and more accurate. For this purpose, the additional time constant $T_S$ of the probe can be calculated under the assumption of a step response in the open-loop control circuit as well as a second-order loop model and with the knowledge of the nominal time constant T as well as the maximum gradient according to amount of the measured air-fuel ratio.

The basis of the calculation is an analytical equation, which describes the maximum gradient $(dx/dt)_{max}$ of the step response of a second-order filter having two time constants, wherein $x_o$ is the height of the step.

$$(dx/dt)_{max}=((Kx_o)/T_1)(T_S/T_1)\hat{\ }(T_S/(T_1-T_S)) \qquad (3)$$

In order to determine the second time constant from the known nominal time constant as well as the maximum gradient according to amount, the analytical equation has to be solved (inverted) for $T_S$, which among other things can occur by means of a non-linear optimization. Because said optimization would be too complex to perform in the control device, the inverse correlation is calculated offline and deposited in the form of an inverse characteristic curve in the control device, whereby the time constant can substantially be determined by accessing the characteristic curve.

Figure 2:
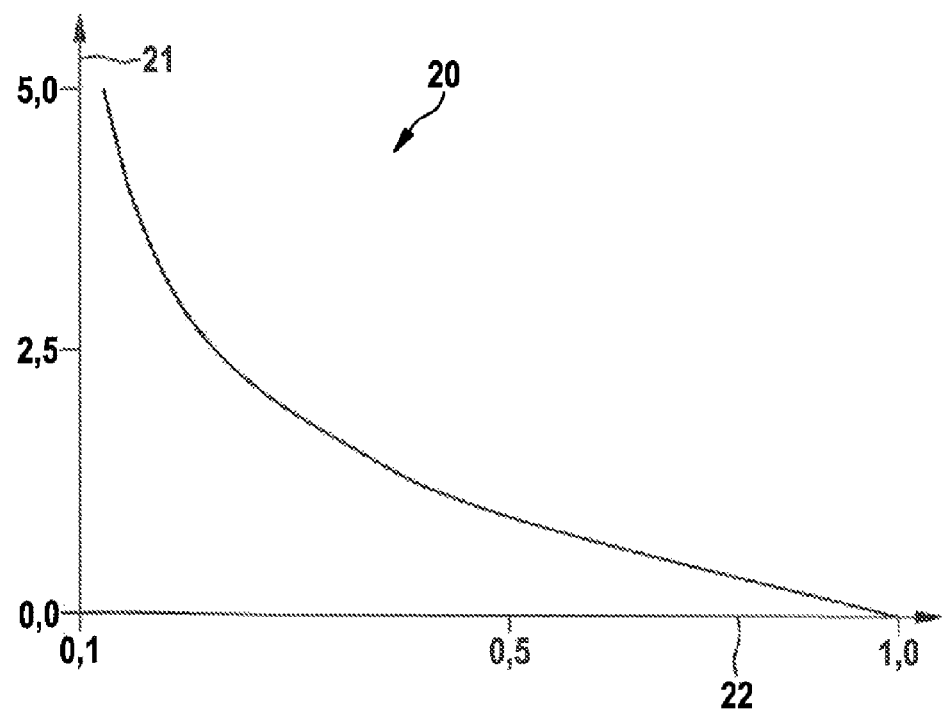
FIG. 2 shows a diagram of a characteristic curve for calculating a time constant for an exhaust gas probe, which time constant is used to perform the diagnosis.

In FIG. 2, such a characteristic curve diagram 20 is depicted by way of example, wherein a time constant ratio 21 for $T_S/T$ is plotted as the y-axis and a ratio of maximum lambda increase/time constant 22 for $(d\lambda/dt)_{max}/T$ in $[\lambda/s^2]$ is plotted as the x-axis. The characteristic curve diagram 20 is depicted so as to be standardized to a step height=1 and a gain=1.

Because the adjustment of the air-fuel ratio and the diagnosis of the exhaust gas probe 15 based thereon occur in the closed-loop control circuit, the derivation of the conversion of the maximum gradient according to amount into additional time constants being however based on an open-loop control circuit, the speed of the controller can furthermore be reduced, which occurs in different ways depending on the structure of the controller. This increases the accuracy of the time constant calculation because the step response in the closed-loop control circuit approximates that of the open-loop control circuit and the influence of the controller is reduced, which influence is not taken into account when deriving the time constants.

The diagnostic function previously described can be implemented in a device according to the invention as software in the engine management system 14, wherein said device comprises at least one characteristic curve unit for calculating the time constant $T_S$ with the aid of said characteristic curve.

The methods and variants thereof disclosed above can also be used for other processes and sensors than the lambda control and the diagnosis of the dynamics of a lambda probe presented here, provided that the process can be approximated by a first-order filter having a time constant as well as if applicable a dead time and that a sensor with a slowed response time can be depicted on the basis of a model through the use of an additional first-order filter.

The invention claimed is:

1. A method for adapting a lambda control of an internal combustion engine (10) including an exhaust gas probe (15) disposed in an exhaust gas duct (18) of the internal combustion engine (10) as part of an exhaust gas monitoring system, wherein an adaptation is carried out on the basis of a comparison between a modeled and a measured signal after a predetermined change in a fuel-air ratio of an air-fuel mixture supplied to said internal combustion engine (10) has taken place and wherein the measured signal is an actual value of an output signal of the exhaust gas probe (15) and the modeled signal is a model value which is derived from the air-fuel mixture supplied to said internal combustion engine (10) using an exhaust gas model, comprising performing an incremental adaptation of the lambda controller parameters of a lambda control, wherein a difference between a maximum gradient according to an amount of the measured air-fuel ratio and a maximum gradient according to an amount for the air-fuel ratio expected from the model is used as a quality criterion.

2. The method according to claim 1, characterized in that on the basis of said difference, the lambda controller is adapted by said controller being incrementally adjusted in a direction of a larger or smaller loop time constant, wherein a size of controller adjustment can be selected as a function of said difference.

3. The method according to claim 2, characterized in that in the case of a difference which is smaller than an applicable threshold value, the incremental adaptation is stopped and the loop time constant, which was last set for a course of the air-fuel ratio determined on the basis of a model, is used for dynamic diagnosis of the exhaust gas probe (15).

4. The method according to claim 2, characterized in that in order to adjust controller parameters to a changed loop time constant, an increase or decrease in controller gain and/or an adaptation of time constants in controller internal loop models is performed.

5. The method according to claim 2, characterized in that the adaptation of the lambda controller parameters is carried out on the basis of the adjusted loop time constant.

6. The method according to claim 2, characterized in that the adjusted loop time constant is compared to an applicable threshold value, and a dynamic behavior for the exhaust gas probe (15) is derived therefrom within the scope of a dynamic diagnosis.

7. The method according to claim 1, characterized in that controller speed is reduced during the diagnosis.

8. The method according to claim 1 for processes with at least one sensor, in which the process can be approximated by a first-order filter having a time constant as well as if applicable a dead time and the behavior of a sensor having a slowed response time can be described through the use of an additional first-order filter.

9. A device for adapting a lambda control of an internal combustion engine (10) having an exhaust gas probe (15) disposed in an exhaust gas duct (18) of an internal combustion engine (10) as part of an exhaust gas monitoring system, wherein an adaptation can be carried out on the basis of a comparison between a modeled and a measured signal after a predetermined change in a fuel-air ratio of an air-fuel mixture supplied to the internal combustion engine (10) has taken place and wherein the measured signal is an actual value of an output signal of the exhaust gas probe (15) and the modeled signal is a model value, which can be derived from the air-fuel mixture supplied to the internal combustion engine (10) through the use of an exhaust gas model, and a comparison between the actual value and the model value can be carried out in a diagnostic unit for the purpose of adapting the air-fuel mixture, characterized in that the diagnostic unit comprises calculation units for difference determination as well as storage units for characteristic curves and comparators for carrying out the adaptation according to claim 1 and at least one time constant can be derived for the exhaust gas probe (15), which can be used in a dynamic diagnosis of said exhaust gas probe (15).

10. A method for adapting a lambda control of an internal combustion engine (10) including an exhaust gas probe (15) disposed in an exhaust gas duct (18) of the internal combustion engine (10) as part of an exhaust gas monitoring system, wherein an adaptation is carried out on the basis of a measured signal after a predetermined change in a fuel-air ratio of an air-fuel mixture supplied to the internal combustion engine (10) has taken place and wherein the measured signal is an actual value of an output signal of the exhaust gas probe (15), comprising calculating a time constant $T_S$ for the exhaust gas probe (15) from a maximum gradient according to an amount of the measured air-fuel ratio.

11. The method according to claim 10, characterized in that the time constant $T_S$ is derived on the basis of a second-order loop model having two time constants, wherein a step response is evaluated in an open-loop control circuit.

12. The method according to claim 10, characterized in that the derivation of the time constant $T_S$ is carried out by means of an offline evaluation of an analytical equation, which describes a maximum gradient of a step response of a second-order filter having two time constants, wherein the correlations are deposited in a diagnostic unit in the form of an inverse characteristic curve and the time constant $T_S$ is determined by accessing the characteristic curve.

13. The method according to claim 10, characterized in that the adaptation of the lambda controller parameters is carried out on the basis of the determined time constant $T_S$.

14. The method according to claim 10, characterized in that the determined time constant $T_S$ is compared to an applicable threshold value, and a dynamic behavior for the exhaust gas probe (15) is derived therefrom within the scope of a dynamic diagnosis.

15. The method according to claim 10, characterized in that controller speed is reduced during the diagnosis.

16. The method according to claim 10 for processes with at least one sensor, in which the process can be approximated by a first-order filter having a time constant as well as if applicable a dead time and the behavior of a sensor having a slowed response time can be described through the use of an additional first-order filter.

17. A device for adapting a lambda control of an internal combustion engine (10) having an exhaust gas probe (15) disposed in an exhaust gas duct (18) of an internal combustion engine (10) as part of an exhaust gas monitoring system, wherein an adaptation can be carried out on the basis of a comparison between a modeled and a measured signal after a predetermined change in a fuel-air ratio of an air-fuel mixture supplied to the internal combustion engine (10) has taken place and wherein the measured signal is an actual value of an output signal of the exhaust gas probe (15) and the modeled signal is a model value, which can be derived from the air-fuel mixture supplied to the internal combustion engine (10) through the use of an exhaust gas model, and a comparison between the actual value and the model value can be carried out in a diagnostic unit for the purpose of adapting the air-fuel mixture, characterized in that the diagnostic unit comprises calculation units for difference determination as well as storage units for characteristic curves and comparators for carrying out the adaptation according to claim 5 and at least one time constant can be derived for the exhaust gas probe (15), which can be used in a dynamic diagnosis of said exhaust gas probe (15).

* * * * *